United States Patent
Weng et al.

(10) Patent No.: US 11,683,189 B2
(45) Date of Patent: Jun. 20, 2023

(54) METHOD AND SYSTEM FOR MAINTAINING PRIVACY AND TRACEABILITY OF BLOCKCHAIN-BASED SYSTEM

(71) Applicant: Jinan University, Guangdong (CN)

(72) Inventors: Jian Weng, Guangdong (CN); Yue Zhang, Guangdong (CN); Jiasi Weng, Guangdong (CN); Ming Li, Guangdong (CN); Weiqi Luo, Guangdong (CN)

(73) Assignee: Jinan University, Guangzhou (CN)

( * ) Notice: Subject to any disclaimer, the term of this patent is extended or adjusted under 35 U.S.C. 154(b) by 619 days.

(21) Appl. No.: 16/824,063

(22) Filed: Mar. 19, 2020

(65) Prior Publication Data

US 2021/0297272 A1    Sep. 23, 2021

(51) Int. Cl.
*H04L 29/06* (2006.01)
*H04L 9/32* (2006.01)
*H04L 9/08* (2006.01)
*H04L 9/40* (2022.01)
(Continued)

(52) U.S. Cl.
CPC .......... *H04L 9/3297* (2013.01); *H04L 9/0825* (2013.01); *H04L 9/0847* (2013.01); *H04L 9/3236* (2013.01); *H04L 9/3247* (2013.01); *H04L 63/0421* (2013.01); *H04W 84/18* (2013.01); *H04L 9/50* (2022.05)

(58) Field of Classification Search
CPC ... H04L 9/3297; H04L 9/0825; H04L 9/0847; H04L 9/3236; H04L 9/3247; H04L 63/0421; H04L 9/50; H04L 63/0414; H04L 63/0407; H04W 84/18
See application file for complete search history.

(56) References Cited

U.S. PATENT DOCUMENTS

| 2015/0381487 A1* | 12/2015 | Broz .................. H04L 63/0471 713/153 |
| 2018/0262505 A1* | 9/2018 | Ligatti ................ G06F 21/6281 |
| 2019/0303920 A1* | 10/2019 | Balaraman .............. H04L 63/12 |

OTHER PUBLICATIONS

Li Y, Susilo W, Yang G, Yu Y, Du X, Liu D, Guizani N. "Toward privacy and regulation in blockchain-based cryptocurrencies". IEEE Network. Feb. 15, 2019;33(5):111-7 (Year: 2019).*

(Continued)

*Primary Examiner* — Yogesh Paliwal

(57) ABSTRACT

With the popularity of Blockchain comes grave security-related concerns. Achieving privacy and traceability simultaneously remains an open question. Efforts have been made to address the issues, while they may subject to specific scenarios. The present disclosure proposes a method, a system, and a device for maintaining privacy and traceability of a Blockchain-based system. The method includes: registering in a Blockchain-based system; transmitting a message from a transmitter T to a receiver R via an anonymous network, after a registration request of the transmitter T has been approved and storing message transmission data generated during a message transmission process in a Blockchain; and performing an identity disclosure by using the message transmission data when the message is detected to be false. The anonymous network may transmit the message by onion routing. The solution proposed by the present disclosure can achieve traceability and privacy for a Blockchain-based system simultaneously.

13 Claims, 5 Drawing Sheets

(51) Int. Cl.
  *H04W 84/18*   (2009.01)
  *H04L 9/00*    (2022.01)

(56) References Cited

OTHER PUBLICATIONS

Zheng D, Jing C, Guo R, Gao S, Wang L. "A traceable blockchain-based access authentication system with privacy preservation in VANETs", IEEE Access. Aug. 21, 2019; 7:117716-26 (Year: 2019).*

M. Li, J. Weng, A. Yang, W. Lu, Y. Zhang, L. Hou, J.-N. Liu, Y. Xiang, and R. H. Deng, "Crowdbc: A blockchain-based decentralized framework for crowdsourcing," IEEE Transactions on Parallel and Distributed Systems, vol. 30, No. 6, pp. 1251-1266, 2018.

Bresson, E., Stern, J., & Szydlo, M. (2002). Threshold Ring Signatures and Applications to Ad-hoc Groups (full version). Lecture Notes in Computer Science, 465-480.

Ali Dorri, Salil S. Kanhere, and Raja Jurdak,Blockchain in Internet of Things: Challenges and Solutions.CoRR, vol. abs/1608.05187, 2016.

T. Luo, S. S. Kanhere, J. Huang, S. K. Das, a nd F. Wu, "Sustainable incentives for mobile crowdsensing: Auctions, lotteries, and trust and reputation systems", IEEE Communications Magazine, Mar. 2017.

Möser, M., Soska, K., Heilman, E., Lee, K., Heffan, H., Srivastava, S et al. (2018). An Empirical Analysis of Traceability in the Monero Blockchain. Proceedings on Privacy Enhancing Technologies, 2018(3), 143-163.

M. Singh and S. Kim, "Blockchain based intelligent vehicle data sharing framework," arXiv preprint arXiv:1708.09721, 2017.

Yuan Lu, Qiang Tang and Guiling Wang, "ZebraLancer: Crowdsource Knowledge atop Open Blockchain, Privately and Anonymously", arXiv:1803.01256v4 [cs.HC] Feb. 17, 2019.

A. Kosba, A. Miller, E. Shi, Z. Wen, and C. Papamanthou, "Hawk:The blockchain model of cryptography and privacy-preserving smart contracts," in 2016 IEEE symposium on security and privacy (SP). IEEE, 2016, pp. 839-858.

Gervais, A., Karame, G. O., Wüst, K., Glykantzis, V., Ritzdorf, H., & Capkun, S. (2016). On the Security and Performance of Proof of Work Blockchains. Proceedings of the 2016 ACM SIGSAC Conference on Computer and Communications Security—CCS'16.

Satoshi Nakamoto,Bitcoin: A Peer-to-Peer Electronic Cash System Wright 2008.

James Pearce,Blockchain in Academia: A Literature Review,2019.

Christian Cachin, Architecture of the Hyperledger Blockchain Fabric,IBM Research, 2016(7).

X. Dorri, M. Steger, S. S. Kanhere, and R. Jurdak, "Blockchain: A distributed solution to automotive security and privacy," IEEE Communications Magazine, vol. 55, No. 12, pp. 119-125, 2017.

Nadia Haddadou, Abderrezak Rachedi, Yacine Ghamri-Doudane. A Job Market Signaling Scheme for Incentive and Trust Management in Vehicular Ad Hoc Networks. IEEE Transactions on Vehicular Technology, Institute of Electrical and Electronics Engineers, 2015, 64 (8), pp. 3657-3674.

P. K. Sharma, S. Y. Moon, and J. H. Park, "Block-vn: A distributed blockchain based vehicular network architecture in smart city " JIPS, vol. 13, No. 1, pp. 184-195, 2017.

Syverson, P. F., Goldschlag, D. M., & Reed, M. G. (n.d.). Anonymous connections and onion routing. Proceedings. 1997 IEEE Symposium on Security and Privacy (Cat. No. 97CB36097).

S. King and S. Nadal, "Ppcoin: Peer-to-peer crypto-currency with proof-of-stake," self-published paper, August, vol. 19, 2012.

D. Goldschlag, M. Reed, and P. Syverson, "Onion routing for anonymous and private internet connections," Naval Research Lab Washington DC Center for High Assurance Computing Systems , Tech. Rep., 1999.

Dr. Gavin Wood, Ethereum: A Secure Decentralised Generalised Transaction Ledger, EIP-150 Revision.

Knirsch, F., Unterweger, A., & Engel, D. (2017). Privacy-preserving blockchain-based electric vehicle charging with dynamic tariff decisions. Computer Science—Research and Development, 33(1-2), 71-79.

F. Reid and M. Harrigan, "An analysis of anonymity in the bitcoin system," in Security and privacy in social networks. Springer, 2013, pp. 197-223.

X. Dorri, S. S. Kanhere, R. Jurdak, and P. Gauravaram, "Blockchain for iot security and privacy: The case study of a smart home," in 2017 IEEE international conference on pervasive computing and communications workshops (PerCom workshops). IEEE, 2017, pp. 618-623.

Zyskind, G., Nathan, O., & Pentland, A. "Sandy." (2015). Decentralizing Privacy: Using Blockchain to Protect Personal Data. 2015 IEEE Security and Privacy Workshops.

* cited by examiner

METHOD AND SYSTEM FOR MAINTAINING PRIVACY AND TRACEABILITY OF BLOCKCHAIN-BASED SYSTEM

TECHNICAL FIELD

The present disclosure relates to the field of Blockchain technology, particularly to a method and a system for maintaining privacy and traceability of Blockchain-based system.

BACKGROUND

Over the past few years, Blockchain has drawn significant attention from both academy and industry. Blockchain is a novel paradigm where distrustful parties make transactions and manage data without involving a trustworthy third-party. Here, transactions refer to interactions occurred between these parties. Blockchain achieves tamper-resistance and traceability for the transactions, offering anonymity and decentralization for the parties. Due to these advanced features, Blockchain can be applied to a wide spectrum of applications, ranging from cryptocurrency, financial services, crowd-sourcing systems, to Vehicular Ad Hoc Networks (VANETs). However, along with its popularity, Blockchain has come an increasing number of attacks, severely undermining the victim's security and privacy. In regards to privacy, although Blockchain can provide anonymity innately, it subjects to various cyber-attacks. For example, F. Reid and M. Harrigan, "*An analysis of anonymity in the bitcoin system*," in *Security and privacy in social networks*. Springer, 2013, pp. 197-223. show that an attacker may disclose the real identity of a given victim by analyzing his public transaction history. Efforts have been made to counter these attacks. An example that addresses the privacy concern is HAWK proposed by Kosba et al., storing the encrypted transactions instead of plaintext ones so that the transactional privacy is guaranteed. The term privacy in the present disclosure refers to data privacy unless explicitly stated otherwise. In data privacy schemes, the identities of parties are public. However, given a message, no efficient adversary can determine if the message is from a specific party. While achieving privacy, these solutions may fail to provide traceability, hindering them to adapt to some scenarios. For example, in crowd-sourcing systems (or crowd-sensing system in VANETs), employers may release tasks for employees, while employees choose the tasks of interest and get paid when they offer proper solutions. During the lifecycle of a task, Blockchain endorses the behaviors of both employers and employees, so that employers/employees can be held accountable when malicious behaviors occur. Offering the privacy blindly in such a scenario will lead a malicious employers/employees to evade responsibilities. The fact that Blockchain fails to provide traceability and privacy simultaneously impedes the progress of its deployment. To address the issue, the present disclosure provides methods and systems offering traceability and privacy at the same time.

SUMMARY

To address the issues described above, the present disclosure proposes method and system for maintaining privacy and traceability of a Blockchain-based system.

The following technical solutions are used in the implementations of the present disclosure:

An implementation of the present disclosure provides a method for maintaining privacy and traceability of a Blockchain-based system, which includes:
registering in a Blockchain-based system; transmitting a message from a transmitter T to a receiver R via an anonymous network after a registration request of the transmitter T has been approved and storing message transmission data generated during a message transmission process in a Blockchain; and performing an identity disclosure by using the message transmission data when the message is detected to be false.

An implementation of the present disclosure further provides a method for maintaining privacy and traceability of a Blockchain-based system, wherein the anonymous network transmits the message by onion routing.

An implementation of the present disclosure further provides a method for maintaining privacy and traceability of a Blockchain-based system, wherein the step of registering in the Blockchain-based system further includes: creating a public/private key pair for the transmitter T; using a private key $SK_T$ to sign identity information of the transmitter T and putting a public key $PubK_T$ and a generated signature together to generate the registration request; and verifying the registration request.

An implementation of the present disclosure further provides a method for maintaining privacy and traceability of a Blockchain-based system, wherein the step of verifying the registration request further includes: comparing the public key $PubK_T$ of the transmitter T with public keys of other parties registered in the Blockchain-based system; confirming whether the public key $PubK_T$ of the transmitter T is the same as the public keys of other parties; broadcasting a confliction and rejecting the registration request, if the public key $PubK_T$ of the transmitter T is the same as any of the public keys of other parties; further checking whether the identity information of the transmitter T is valid or not, if the public key $PubK_T$ of the transmitter T is not the same as any of the public keys of other parties; rejecting the registration request, if the identity information of the transmitter T is invalid; and writing the registration request onto the Blockchain if the identity information of the transmitter T is valid.

An implementation of the present disclosure further provides a method for maintaining privacy and traceability of a Blockchain-based system, wherein the step of transmitting the message from the transmitter T to a receiver R via the anonymous network further includes: randomly choosing at least three nodes A,B,C in a Blockchain P2P network as the relays; negotiating different encryption keys $K_{T-A}$, $K_{T-B}$, $K_{T-C}$ with the nodes; encrypting the message to be transmitted with the different encryption keys $K_{T-A}$, $K_{T-B}$, $K_{T-C}$ successively to obtain an encrypted message $EV_0$, hard-coding information of the next hop for each node inside the encrypted message; decrypting the encrypted message $EV_0$ by the encryption key $K_{T-A}$ to obtain a packet $V_0$, generating an evidence $EV_1$ once decrypted, submitting the evidence $EV_1$ to the Blockchain, and transmitting the packet $V_0$ to the node B; decrypting the packet $V_0$ by the encryption key $K_{T-B}$ to obtain a packet $V_1$, generating an evidence $EV_2$ once decrypted, submitting the evidence $EV_2$ to the Blockchain, and transmitting the packet $V_1$ to the node C; decrypting the packet $V_1$ by the encryption key $K_{T-C}$ to obtain the message, generating an evidence $EV_3$ once decrypted, submitting the evidence $EV_3$ to the Blockchain, and transmitting the message to the receiver R; and generating an evidence $EV_4$ after the receiver R received the message and submitting the evidence $EV_4$ to the Blockchain. The message transmission date includes at least the evidence $EV_1$, $EV_2$, $EV_3$, $EV_4$.

An implementation of the present disclosure further provides a method for maintaining privacy and traceability of a Blockchain-based system, wherein the steps of generating the evidence $EV_1$, $EV_2$, $EV_3$, $EV_4$ further includes: signing the encrypted message $EV_0$ with the private key $SK_T$ of the transmitter T to obtain $EV_0|SIGN(SK_T,EV_0)$ and sending $EV_0|SIGN(SK_T,EV_0)$ to the node A, verifying a signature of the transmitter T by the node A using the public key $PubK_T$ of the transmitter T, signing $SIGN(SK_T,EV_0)$ with a private key $SK_A$ of the node A to obtain $SIGN(SK_A,SIGN(SK_T,EV_0))$, negotiating a new key $PK_{T-A}$, termed proof key, by the transmitter T and the node A, and encrypting $SIGN(SK_A, SIGN(SK_T,EV_0))$ with the new key $PK_{T-A}$ to generate the evidence $EV_1$; signing the evidence $EV_1$ with the private key $SK_A$ of the node A to obtain $SIGN(SK_A, V_0\|EV_1)$ and sending $SIGN(SK_A, V_0\|EV_1)$ to the node B, verifying a signature of the node A by the node B using the public key $PubK_A$ of the node A, signing $SIGN(SK_A, V_0\|EV_1)$ with a private key $SK_B$ of the node B to obtain $SIGN(SK_B, SIGN(SK_A, V_0\|EV_1))$, negotiating a proof key $PK_{A-B}$ by the node A and the node B, and encrypting $SIGN(SK_B, SIGN(SK_A, V_0\|EV_1))$ with the proof key $PK_{A-B}$ to generate the evidence $EV_2$; signing the evidence $EV_2$ with the private key $SK_B$ of the node B to obtain $SIGN(SK_B, V_1\|EV_2)$ and sending $SIGN(SK_B, V_1\|EV_2)$ to the node C, verifying a signature of the node B by the node C using the public key $PubK_B$ of the node B, signing $SIGN(SK_B, V_1\|EV_2)$ with a private key $SK_C$ of the node C to obtain $SIGN(SK_C, SIGN(SK_B, V_1\|EV_2))$, negotiating a proof key $PK_{B-C}$ by the node B and the node C, and encrypting $SIGN(SK_C, SIGN(SK_B, V_1\|EV_2))$ with the proof key $PK_{B-C}$ to generate the evidence $EV_3$; and signing the encrypted message $EV_3$ with the private key $SK_C$ of the node C to obtain $SIGN(SK_C, m\|EV_3)$ and sending $SIGN(SK_C, m\|EV_3)$ to the receiver R, verifying a signature of the node C by the receiver R using the public key $PubK_C$ of the node C, signing $SIGN(SK_C, m\|EV_3)$ with a private key $SK_R$ of the receiver R to obtain $SIGN(SK_R, SIGN(SK_C, m\|EV_3))$, negotiating a proof key $PK_{C-R}$ by the node C and the receiver R, and encrypting $SIGN(SK_R, SIGN(SK_C, m\|EV_3))$ with the proof key $PK_{C-R}$ to generate the evidence $EV_4$.

An implementation of the present disclosure further provides a method for maintaining privacy and traceability of a Blockchain-based system, wherein the proof keys $PK_{T-A}$, $PK_{A-B}$, $PK_{B-C}$, $PK_{C-R}$ are respectively kept by two sides involved in the negotiation of each proof key, the encryption key $K_{T-A}$ and the proof key $PK_{T-A}$ cannot be the same, and whenever a new message is transmitted, new proof keys are negotiated.

An implementation of the present disclosure further provides a method for maintaining privacy and traceability of a Blockchain-based system, wherein the step of performing an identity disclosure further includes: launching the identity disclosure when an identity disclosure request has been approved by a majority of parties; and decrypting the evidence $EV_1$, $EV_2$, $EV_3$, $EV_4$ using the proof keys $PK_{T-A}$, $PK_{A-B}$, $PK_{B-C}$, $PK_{C-R}$.

An implementation of the present disclosure further provides a method for maintaining privacy and traceability of a Blockchain-based system, wherein the step of decrypting the evidence $EV_1$, $EV_2$, $EV_3$, $EV_4$ using the proof keys $PK_{T-A}$, $PK_{A-B}$, $PK_{B-C}$, $PK_{C-R}$ further includes: locating the evidence $EV_4$ on the Blockchain by the receiver R, making a location of the evidence $EV_4$ and the proof key $PK_{C-R}$ publicly accessible, such that all parties in the Blockchain P2P network can perform a decryption process $DEC(PK_{C-R},EV_4)=SIGN(SK_R, SIGN(SK_C, m\|EV_3))=S_4$, and performing a signature verification $VERIFY(PubK_C,S_4, (m\|EV_3)))$ by all the parties; making $PK_{B-C}$ publicly accessible by the node C, such that all parties in the Blockchain P2P network can perform a decryption process $DEC(PK_{B-C},EV_3)=SIGN(SK_C, SIGN(SK_B, V_1\|EV_2))=S_3$, and performing a signature verification $VERIFY(PubK_B,S_3, (V_1\|EV_2)))$ by all the parties; making $PK_{A-B}$ publicly accessible by the node B, such that all parties in the Blockchain P2P network can perform a decryption process $DEC(PK_{A-B},EV_2)=SIGN(SK_B, SIGN(SK_A, V_0\|EV_1))=S_2$, and performing a signature verification $VERIFY(PubK_A,S_2, (V_0\|EV_1)))$ by all the parties; making $PK_{T-A}$ publicly accessible by the node A, such that all parties in the Blockchain P2P network can perform a decryption process $DEC(PK_{T-A},EV_1)=SIGN(SK_A,SIGN(SK_T,EV_0))=S_1$, and performing a signature verification $VERIFY(PubK_T,S_1, EV_0))$ by all the parties; and releasing encryption keys $K_{T-A}$, $K_{T-B}$, $K_{T-C}$ by the transmitter T after T is accused of false message spreading.

An implementation of the present disclosure further provides a system for maintaining privacy and traceability of a Blockchain-based system, which includes: one or more processors and one or more memory devices interoperably coupled with the one or more processors and having tangible, non-transitory, machine-readable media storing one or more instructions that, when executed by the one or more processors, perform one or more operations of the methods described above.

An implementation of the present disclosure further provides a non-transitory, computer-readable medium storing one or more instructions executable by a computer system to perform operations of the methods described above.

An implementation of the present disclosure further provides a device for maintaining privacy and traceability of a Blockchain-based system. The device includes one or more processors and one or more memory devices interoperably coupled with the one or more processors. The one or more memory devices contain a tangible, non-transitory, machine-readable media storing one or more modules including a registration module for parties to sign up in the Blockchain-based system, a message transmitting module for transmitting message, and an identity disclosure module for disclosing the identity of a party spreading false information when the dishonest behavior has been detected.

The registration module is configured to perform operations including: creating a public/private key pair for the transmitter T; using a private key $SK_T$ to sign identity information of the transmitter T and putting a public key $PubK_T$ and a generated signature together to generate the registration request; and verifying the registration request. The step of verifying the registration request further includes: comparing the public key $PubK_T$ of the transmitter T with public keys of other parties registered in the Blockchain-based system; confirming whether the public key $PubK_T$ of the transmitter T is the same as the public keys of other parties; broadcasting a confliction and rejecting the registration request, if the public key $PubK_T$ of the transmitter T is the same as any of the public keys of other parties; further checking whether the identity information of the transmitter T is valid or not, if the public key $PubK_T$ of the transmitter T is not the same as any of the public keys of other parties; rejecting the registration request, if the identity information of the transmitter T is invalid; and writing the registration request onto the Blockchain if the identity information of the transmitter T is valid.

The message transmitting module is configured to perform operations including: randomly choosing at least three nodes A,B,C in a Blockchain P2P network as the relays;

negotiating different encryption keys $K_{T-A}$, $K_{T-B}$, $K_{T-C}$ with the nodes; encrypting the message to be transmitted with the different encryption keys $K_{T-A}$, $K_{T-B}$, $K_{T-C}$ successively to obtain an encrypted message $EV_0$, hard-coding information of the next hop for each node inside the encrypted message; decrypting the encrypted message $EV_0$ by the encryption key $K_{T-A}$ to obtain a packet $V_0$, generating an evidence $EV_1$ once decrypted, submitting the evidence $EV_1$ to the Blockchain, and transmitting the packet $V_0$ to the node B; decrypting the packet $V_0$ by the encryption key $K_{T-B}$ to obtain a packet $V_1$, generating an evidence $EV_2$ once decrypted, submitting the evidence $EV_2$ to the Blockchain, and transmitting the packet $V_1$ to the node C; decrypting the packet $V_1$ by the encryption key $K_{T-C}$ to obtain the message, generating an evidence $EV_3$ once decrypted, submitting the evidence $EV_3$ to the Blockchain, and transmitting the message to the receiver R; and generating an evidence $EV_4$ after the receiver R received the message and submitting the evidence $EV_4$ to the Blockchain. The message transmission date includes at least the evidence $EV_1$, $EV_2$, $EV_3$, $EV_4$. The evidence $EV_1$ is generated by the following operations: signing the encrypted message $EV_0$ with the private key $SK_T$ of the transmitter T to obtain $EV_0|SIGN(SK_T,EV_0)$ and sending $EV_0|SIGN(SK_T,EV_0)$ to the node A, verifying a signature of the transmitter T by the node A using the public key $PubK_T$ of the transmitter T, signing $SIGN(SK_T,EV_0)$ with a private key $SK_A$ of the node A to obtain $SIGN(SK_A, SIGN(SK_T,EV_0))$, negotiating a new key $PK_{T-A}$, termed proof key, by the transmitter T and the node A, and encrypting $SIGN(SK_A,SIGN(SK_T,EV_0))$ with the new key $PK_{T-A}$ to generate the evidence $EV_1$. The evidence $EV_2$ is generated by the following operations: signing the evidence $EV_1$ with the private key $SK_A$ of the node A to obtain $SIGN(SK_A, V_0\|EV_1)$ and sending $SIGN(SK_A, V_0\|EV_1)$ to the node B, verifying a signature of the node A by the node B using the public key $PubK_A$ of the node A, signing $SIGN(SK_A, V_0\|EV_1)$ with a private key $SK_B$ of the node B to obtain $SIGN(SK_B, SIGN(SK_A, V_0\|EV_1))$, negotiating a proof key $PK_{A-B}$ by the node A and the node B, and encrypting $SIGN(SK_B, SIGN(SK_A, V_0\|EV_1))$ with the proof key $PK_{A-B}$ to generate the evidence $EV_2$. The evidence $EV_3$ is generated by the following operations: signing the evidence $EV_2$ with the private key $SK_B$ of the node B to obtain $SIGN(SK_B, V_1\|EV_2)$ and sending $SIGN(SK_B, V_1\|EV_2)$ to the node C, verifying a signature of the node B by the node C using the public key $PubK_B$ of the node B, signing $SIGN(SK_B, V_1\|EV_2)$ with a private key $SK_C$ of the node C to obtain $SIGN(SK_C, SIGN(SK_B, V_1\|EV_2))$, negotiating a proof key $PK_{B-C}$ by the node B and the node C, and encrypting $SIGN(SK_C, SIGN(SK_B, V_1\|EV_2))$ with the proof key $PK_{B-C}$ to generate the evidence $EV_3$. The evidence $EV_4$ is generated by the following operations: signing the encrypted message $EV_3$ with the private key $SK_C$ of the node C to obtain $SIGN(SK_C, m\|EV_3)$ and sending $SIGN(SK_C, m\|EV_3)$ to the receiver R, verifying a signature of the node C by the receiver R using the public key $PubK_C$ of the node C, signing $SIGN(SK_C, m\|EV_3)$ with a private key $SK_R$ of the receiver R to obtain $SIGN(SK_R, SIGN(SK_C, m\|EV_3))$, negotiating a proof key $PK_{C-R}$ by the node C and the receiver R, and encrypting $SIGN(SK_R, SIGN(SK_C, m\|EV_3))$ with the proof key $PK_{C-R}$ to generate the evidence $EV_4$.

The identity disclosure module is configured to perform operations including: launching the identity disclosure when an identity disclosure request has been approved by a majority of parties, and decrypting the evidence $EV_1$, $EV_2$, $EV_3$, $EV_4$ using the proof keys $PK_{T-A}$, $PK_{A-B}$, $PK_{B-C}$, $PK_{C-R}$. The evidence $EV_4$ is decrypted by the following operations: locating the evidence $EV_4$ on the Blockchain by the receiver R, making a location of the evidence $EV_4$ and the proof key $PK_{C-R}$ publicly accessible, such that all parties in the Blockchain P2P network can perform a decryption process DEC $(PK_{C-R},EV_4)=SIGN(SK_B, SIGN(SK_C, m\|EV_3))=S_4$, and performing a signature verification $VERIFY(PubK_C, S_4, (m\|EV_3))$ by all the parties. The evidence $EV_3$ is decrypted by the following operations: making $PK_{B-C}$ publicly accessible by the node C, such that all parties in the Blockchain P2P network can perform a decryption process $DEC(PK_{B-C}, EV_3)=SIGN(SK_C, SIGN(SK_B, V_1\|EV_2))=S_3$, and performing a signature verification $VERIFY(PubK_B, S_3, (V_1\|EV_2))$ by all the parties. The evidence $EV_2$ is decrypted by the following operations: making $PK_{A-B}$ publicly accessible by the node B, such that all parties in the Blockchain P2P network can perform a decryption process $DEC(PK_{A-B},EV_2)=SIGN(SK_B, SIGN(SK_A, V_0\|EV_1))=S_2$, and performing a signature verification $VERIFY(PubK_A,S_2, (V_0\|EV_1))$ by all the parties. The evidence $EV_1$ is decrypted by the following operations: making $PK_{T-A}$ publicly accessible by the node A, such that all parties in the Blockchain P2P network can perform a decryption process $DEC(PK_{T-A},EV_1)=SIGN(SK_A,SIGN(SK_T,EV_0)=S_1$, and performing a signature verification $VERIFY(PubK_T,S_1, EV_0)$ by all the parties. Finally, transmitter T is required to make a proof key publicly accessible. However, T does not have a proof key for $EV_0$, since T is the message transmitter. Therefore, T is accused of false message spreading. In this case, T can also release the encryption keys $K_{T-A}$, $K_{T-B}$, $K_{T-C}$, which is considered as a "confession".

At least one technical solution used in the implementations of the present disclosure can achieve the following effects:

The present disclosure proposes a general solution to provide traceability and privacy simultaneously for a Blockchain-based system. By combining onion routing (or any other anonymous networks that can achieve similar functions of onion routing) and Blockchain technology, the solution of the present disclosure can offer traceability and privacy at the same time. Onion routing is an infrastructure designed for anonymous communication. It uses a set of onion routers instead of using regular routers. The onion routers encrypt and relay packets between a source node and a destination node. In terms of privacy, onion routers resistant to both eavesdropping and traffic analysis innately, since the encryption process is present. In terms of traceability, onion routing is a communication mechanism featuring routing and packets transmitting. In the view of the onion routers, they can identify an intended source and an intended destination by decrypting the encrypted packets accordingly. But, for a single onion router, it has limited routing information and provides packets forwarding partly. Therefore, for most of the time, as a destination or an onion router, they cannot trace the packets back to the source. This is because tracing a packet needs the efforts of all relaying onion routers, but the onion routers will not work cooperatively to make this happen since they are different nodes in the network. The solution of the present disclosure systematically investigates the underlying principles of the onion routing to combine with the Blockchain technology. The high-level idea is that Blockchain is introduced as a trustworthy party, and enable the onion router-like nodes to decrypt the packets to Blockchain conditionally. That is, Blockchain will perform the identity disclosure according to the willingness of the majority. In such a way, the solution of the present disclosure achieves traceability and privacy simultaneously. Normally, the solution of the present disclosure will offer privacy for each party. In the special case where disclosure is needed, parties will work closely to make the disclosure happen. To notice, the solution of the present disclosure integrates the mechanism of onion routing together with Blockchain technology instead of using onion routing as a building block directly. More importantly, while achieving privacy, using onion routing barely fails to provide a proper solution for nodes to work jointly to disclose a specific identity. In the present disclosure, the term privacy refers to data privacy, where identities of parties are public, while there is no efficient adversary can determine if a given message is sent from a specific party. That is, as long as a party behave honestly, nobody can link the message the party sent to the public identity of the party. The identity may include IP address, Mac address, or other personal information. The present disclosure can avoid the leakage of the information of these parties. With regard to traceability, the present disclosure enables the disclosure of the identity of a specific party following the willingness of the majority of parties. That is, when a dishonest/malicious behavior occurs, the majority of parties may require the system of the present disclosure to reveal the identity of a party, the system of the present disclosure will fulfill the requirement.

BRIEF DESCRIPTION OF THE DRAWINGS

The drawings described here are intended to provide a further understanding of the present disclosure, and constitute a part of the present disclosure. The illustrative implementations of the present disclosure and description of the implementations are intended to describe the present disclosure, and do not constitute limitations on the present disclosure.

DETAILED DESCRIPTION OF THE EMBODIMENTS

Figure 1:
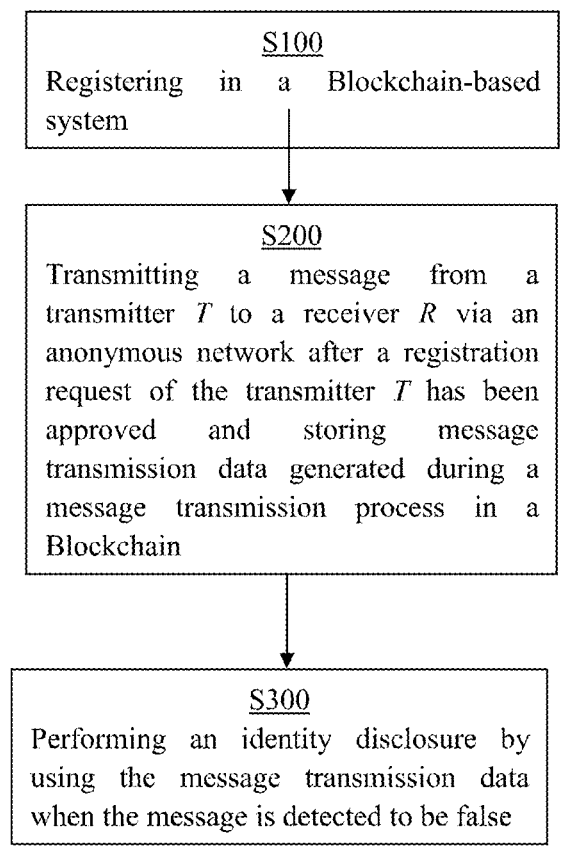
FIG. 1 is a flowchart of a method for maintaining privacy and traceability of a Blockchain-based system according to an exemplary embodiment of the present disclosure.

The exemplary embodiments of the present disclosure are described below in detail with reference to the drawings. It should be understood that the exemplary embodiments described below are used only to illustrate and interpret the present disclosure and are not intended to limit the present disclosure.

It should be noted that the exemplary embodiments of the present disclosure and features in the exemplary embodiments may be combined with each other in the case of no conflict, and all the combinations fall within the protection scope of the present disclosure. In addition, although a logical order is shown in the flowchart, the steps shown or described may be performed in a different order from the order here in some cases.

In implementations, a computing device that performs a data processing method may include one or more processors (CPU, Central Processing Module), an input/output interface, a network interface and a memory.

The memory may include a volatile memory, a random access memory (RAM) and/or a non-volatile memory and other forms in a computer readable medium, for example, a read-only memory (ROM) or a flash RAM. The memory is an example of the computer readable medium. The memory may include a module 1, a module 2, . . . , and a module N (N is an integer greater than 2).

The computer readable medium includes non-volatile and volatile media as well as removable and non-removable storage media. A storage medium may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic disk storage or other magnetic storage devices, or any other non-transmission media, and may be used to store information accessible to the computing device.

Onion routing can resist to eavesdropping and traffic analysis innately. It is observed that the onion routers will relay the packets between an intended source and an intended destination. For most of the time, as a destination, it cannot trace the packets back to the source. This is because the destination and its previous hop, which is an onion router, are different nodes in the network. They shall not share the hop or routing information with each other. But what if the destination node and the three onion routers are all manipulated by a third-party behind? In this case, the third-party can obtain all the routing information, and trace from a destination back to a source. That is, he is capable of disclosing the identity of the source. Here, such a third party can be a good or evil one, depending on if and how he will perform the disclosure. If he is ultimately fair and only behaves according to the willingness of the majority, he is a good one. However, does such a flawless third party exist? To solve these problems, the present disclosure proposes the following solutions.

The notations used in the present disclosure are summarized in TABLE 1 below.

TABLE 1

Summary of notations

| Notation | Description |
| --- | --- |
| a → b | a routing message, where a is the source and b is the destination |
| $PubK_i$ | the public key of a party i |
| $SK_i$ | the private key of a party i |
| $s_1 \| s_2$ | a combination of a string $s_1$ and a string $s_2$ |
| ENC(key,msg) | The AES encryption process, where key refers to a encryption key, and msg refers to a message |
| DEC(key, ctext) | The decryption process, where key refers to a encryption key, and ctext refers to a cipher-text |

TABLE 1-continued

Summary of notations

| Notation | Description |
| --- | --- |
| SIGN(SK,msg) | The signature generation process, where SK refers to a private key, and msg refers to a message |
| VERIFY (PubK,sigm) | The signature generation process, where PubK refers to a private key, and sig refers to a signature, while m is the message |

As shown in FIG. 1, an exemplary embodiment of the present disclosure provides a method for maintaining privacy and traceability of a Blockchain-based system, which includes:

S100: registering in a Blockchain-based system;

S200: transmitting a message from a transmitter T to a receiver R via an anonymous network after a registration request of the transmitter T has been approved and storing message transmission data generated during a message transmission process in a Blockchain; and S300: performing an identity disclosure by using the message transmission data when the message is detected to be false.

S100 is used for parties to join the block-chain based system. To this end, each party must provide their real identity to the system distributedly, and the system will store these information onto Blockchain. All these information are free to access for the public. In regard of privacy-preserving, although the information is publicly accessible, an attacker cannot link a specific message to its sender according to the solution of the present disclosure. The privacy of each party is still preserved. S200 defines how two parties transmit a message via the network. Different from the traditional network communication, the message sender and the message responder may need to write data onto Blockchain. The message transmission data, termed evidence in the following description, is encrypted by negotiated keys, and also plays an important role in the identity disclosure process. S300 will perform when the parties have the requirement to disclose a specific sender. Say, when false information is identified, the parties want to know who is the sender of this false information. According to the solution of the present disclosure, the identity disclosure process can link the false information to a specific sender by decrypting the evidence.

In an exemplary embodiment of the present disclosure, the anonymous network transmits the message by onion routing.

In an exemplary embodiment of the present disclosure, the step of registration works as follows: (i) When a party A wants to join the system, he first creates a public/private key pair, denoted as $SK_A$, $PubK_A$, which can be used to perform signature generation and verification. (ii) He uses his private key $SK_A$ to sign his real identity ID, and put his public key $PubK_A$ and the generated signature S together to generate a registration request, i.e. regReq=($PubK_A$∥S). The ID here uniquely refers to a specific party. He submits the registration request to the Blockchain P2P network and preserves his private key carefully. To notice, before the request having been approved and written onto Blockchain, A is not permitted to send any other request. (iii) Other parties will verify the registration request before they write it onto Blockchain. The verification process is to make sure that the signature is generated from the attached public key $PubK_A$, and the one who sends the request has the same identity as attached. Otherwise, other parties will reject the request. The other parties also need to check if the public key attached has been used by other parties else. Since the request can be viewed by all the parties, it is trivial for them to identify a duplicate public key. That is, each party compares the attached public key with his own public key and confirms that they are not the same. If they are the same, the party with the same public key will broadcast a confliction. The confliction is also a type of request that has a higher priority or other parties to process. Also, other parties may need to check if the identity used is a valid one or fabricated by the party itself. Therefore, the Blockchain used may be a permissioned Blockchain. The permissioned blockchain is a type of Blockchain that requires permission to join, and limits the parties who can provide the solution for the puzzle, i.e., being the miners. It is to be noticed that all parties other than miners can submit their transactions into Blockchain network, but only miners have the permission to record the transactions. This is reasonable because it reduces the risk of being attacked by some attacks, e.g., 51% attack and selfish mining attack. The process of how to group the requests as transitions, and how to write the transactions are as same as Bitcoin, and will not be described in detail herein.

Figure 2:
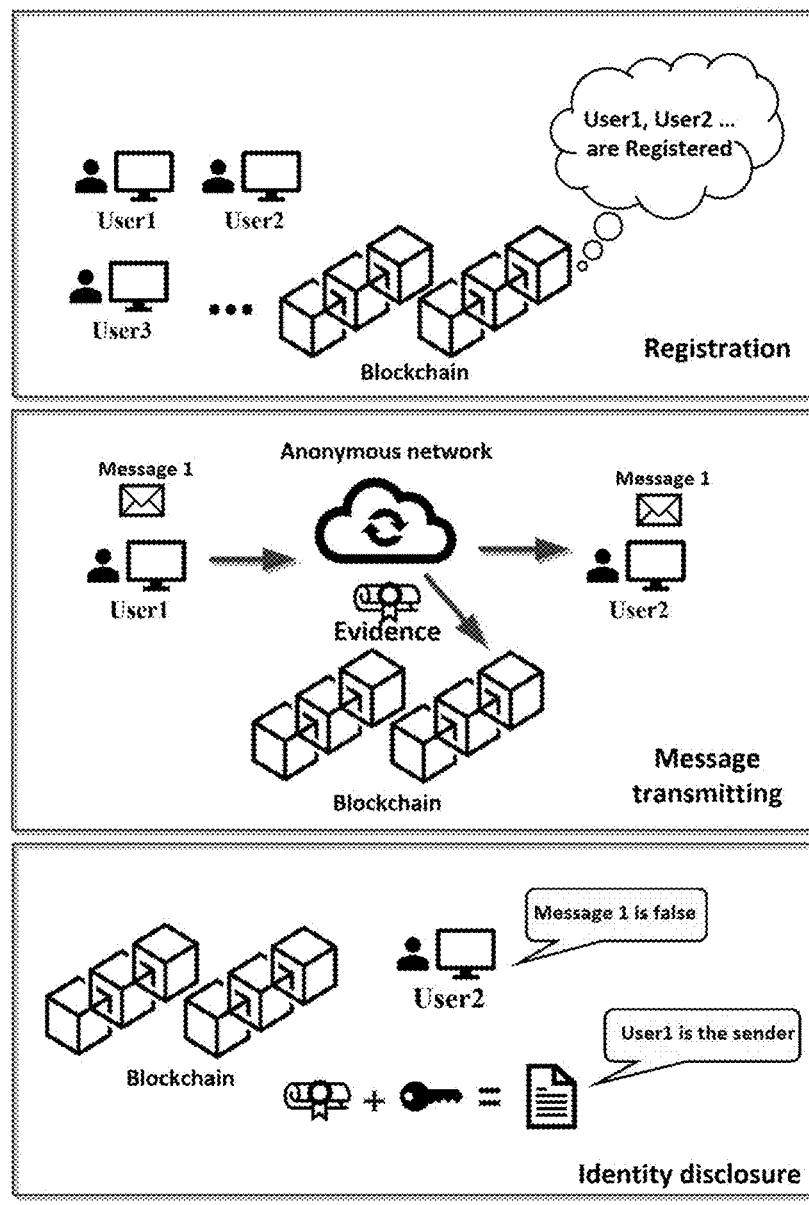
FIG. 2 is a schematic diagram of a system for maintaining privacy and traceability of a Blockchain-based system according to an exemplary embodiment of the present disclosure.

In an exemplary embodiment of the present disclosure, the message transmission works as follows. As shown in FIG. 2, three hops are used as relays between a transmitter T and a receiver R to demonstrate the principle. However, it should be noted that the present disclosure is not limited thereto, the number of the relays may also be other integers other than 1 and 3, and the relays work in the same principle as the relays discussed below. Parties can choose more than three hops to achieve better privacy. Specifically, the steps of the message transmission include: 1) Initially, the sender who wants to send the message first randomly chooses three nodes in the Blockchain P2P network. The three nodes are denoted as A, B, C respectively. The sender also negotiates the three different keys with the three nodes. The key negotiation process is as same as that in onion routing, which will not be repeated herein. We denote the encryption keys as $K_{T\text{-}A}$, $K_{A\text{-}B}$, $K_{B\text{-}C}$, where the first letter in subscript refers to the sender of the packet, while the second letter refers to the packets responder. For example, $K_{T\text{-}A}$ is used to encrypt a message that is sent from T to A. 2) T encrypts the message with the three encryption keys successively. The user also hard-code the next-hop information, e.g., A→B, inside the encrypted message, to make sure that each node is aware of its next-hop respectively. As mentioned earlier, the encrypted message is also called evidence in the present disclosure. To notice, during the message transmitting, more than one evidence is generated. Here, the encrypted message is referred to as evidence $EV_0$. The message is referred to as m, which contains a timestamp to grantee the freshness of messages. Formally, $EV_0$ can be represented as equation (1):

$$EV_0=ENC(K_{T\text{-}A},(A{\to}B\|ENC(K_{A\text{-}B},(B{\to}C\|ENC(K_{B\text{-}C},(C{\to}R\|m)))))) \qquad (1)$$

3) A first removes the first layer encryption by decrypting the $EV_0$ with the key $K_{T\text{-}A}$, which is negotiated before. The decrypted packet is referred to as $V_0$. Formally, $V_0$ can be represented as equation (2):

$$V_0=ENC(K_{A\text{-}B},(B{\to}C\|ENC(K_{B\text{-}C},(C{\to}R\|m)))) \qquad (2)$$

Once decrypted, A then knows which node is the next hop. Then, A will send $V_0$ packet to B, and the key used between A and B is $K_{A\text{-}B}$. Before this process, A also needs to generate a new evidence and submit it to Blockchain first. Here, A and T are required to work closely, and generate a new evidence $EV_1$. To this end, T signs $EV_0$ with his private key, and sends $EV_0$|SIGN($SK_T$,$EV_0$) to the first node A. The first node verifies the signature using the public key of T. As mentioned above, the public key was written onto Blockchain in the registration process and free to index. This step is used to ensure the message is sent from T, not other parties. Once the verification processed, A signs SIGN($SK_T$, $EV_0$) with his own private key $SK_A$. Thereafter, the two parties negotiate a new key $PK_{T-A}$, termed proof key, then encrypts SIGN($SK_A$,SIGN($SK_T$,$EV_0$)) with $PK_{T-A}$ to generate the new evidence $EV_1$. This step ensures that A receives the message successfully. The $EV_1$ is supposed to be written on Blockchain. Here, T and A have the same proof key $PK_{T-A}$, so that they can check the signatures and confirms that they all follow the procedures properly, while other parities will have no information about $EV_1$. To notice, the $K_{T-A}$ and $PK_{T-A}$ cannot be the same, and each party is required to keep the PK carefully for the further usage. Also, every time when a new message is sent, each party needs to negotiate a new proof key. Formally, $EV_1$ can be represented as equation (3):

$$EV_1 = ENC(PK_{T-A}, SIGN(SK_A, (SIGN(SK_T, EV_0)))) \quad (3)$$

4) A will wait until $EV_1$ is written onto Blockchain. Thereafter, A will send $V_0$ packet to B. B then removes the second layer encryption with the key $K_{A-B}$ and generate the packet $V_1$. Formally, $V_1$ can be represented as equation (4):

$$V_1 = ENC(K_{B-C}, (C \rightarrow R \| m)) \quad (4)$$

Afterwards, A and B work closely to generate a new evidence $EV_2$. The process is similar to what have been elaborated in previous step, and will not be repeated in detail herein. Specifically, $EV_2$ can be represented as equation (5):

$$EV_2 = ENC(PK_{A-B}, SIGN(SK_B, SIGN(SK_A, V_0 \| EV_1))) \quad (5)$$

5) B will wait until $EV_2$ is written onto Blockchain. Thereafter, B will send $V_1$ to C. C then removes the finally layer encryption with the key $K_{B-C}$ and obtains the message m in plain-text. At this time, B and C work closely to generate a new evidence $EV_3$. Specifically, $EV_3$ can be represented as shown in equation (6):

$$EV_3 = ENC(PK_{B-C}, SIGN(SK_C, SIGN(SK_B, V_1 \| EV_2))) \quad (6)$$

6) C will wait until $EV_3$ is written onto Blockchain. Afterwards, C will send message to R. R and C then work closely to generate a new evidence $EV_4$. Specifically, $EV_4$ can be represented as equation (7):

$$EV_4 = ENC(PK_{C-R}, SIGN(SK_R, SIGN(SK_C, m \| EV_3))) \quad (7)$$

In an exemplary embodiment of the present disclosure, the identity disclosure works as follows. An example algorithm for one of the implementations of the identity disclosure is presented below. However, it should be noted that the present disclosure is not limited thereto.

```
Data m_fake, EV_i
Output R_x
j = i - 1;
V_j = m_fake;
for j > 0 do
|    Relaying node R_{j-1} release his proof key
|        PK_{R_{j-1}};
|    if PK_{R_{j-1}} == Ø then
|    |    R_x = R_{j-1};
|    |    RETURN R_x;
|    end
|    else
|    |    DEC(PK_{j-i}, EV_j)
|    |    = SIGN(SK_{R_{j-1}}, SIGN(SK_{R_{j-1}} PK_{j-1} \| V_j);
|    |    = S_j
|    |    if VERIFY(PubK_{j-1}, S_j, (V_j \| EV_{j-1})) then
|    |    |    if VERIFY(PubK_{j-2}, S_j, (V_j \| EV_{j-1})))
|    |    |    then
|    |    |    |    j=j-1
|    |    |    end
|    |    |    else
|    |    |    |    R_x = R_{j-2};
|    |    |    |    RETURN R_x;
|    |    |    end
|    |    end
|    |    else
|    |    |    R_x = R_{j-1};
|    |    |    RETURN R_x;
|    |    end
|    end
end
R_x = R_{j-1};
RETURN R_x;
```

Figure 3:
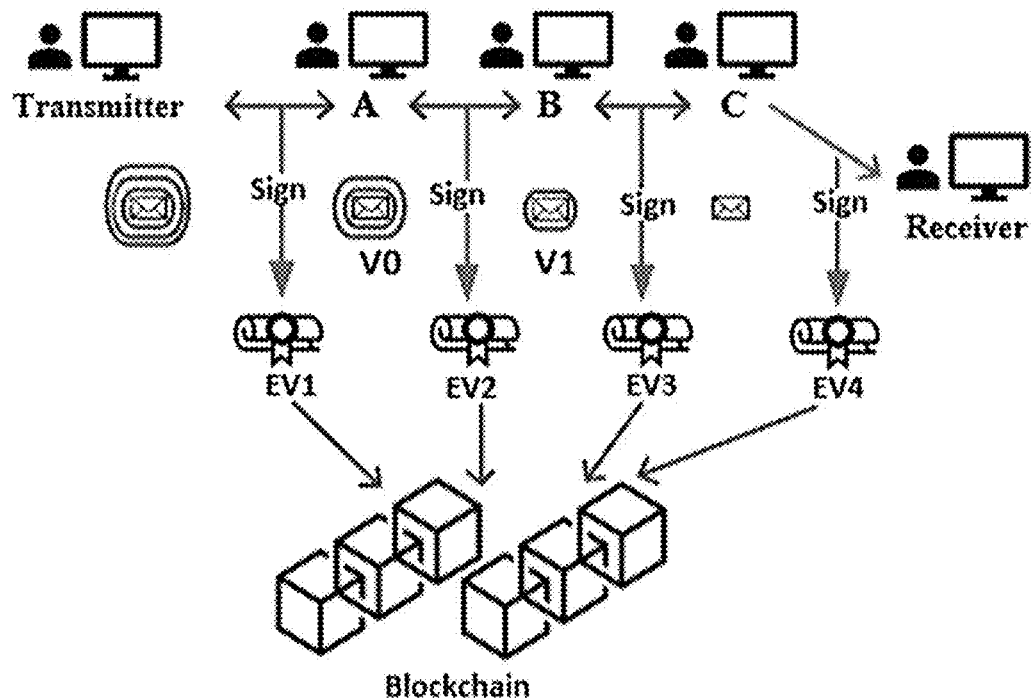
FIG. 3 is a schematic diagram showing the message transmission according to an exemplary embodiment of the present disclosure.

FIG. 3 shows an exemplary embodiment of the identity disclosure of the present disclosure. 1) The receiver R requires a party C to perform the plea of innocence since R receives the false message from C. To prove so, R locates evidence $EV_4$ on Blockchain, and makes the location of $EV_4$ and the $PK_{C-R}$ publicly accessible. In this way, all parties in the Blockchain P2P network can perform the decryption process, as shown in equation (8).

$$DEC(PK_{C-R}, EV_4) = SIGN(SK_R, SIGN(SK_C, m \| EV_3)) = S_4 \quad (8)$$

After the decryption process, all parties know that the previous hop is C, which was confirmed by C and R, since their signature are present. As shown in equation 9, all parties can perform their signature verification without any changes.

$$VERIFY(PubK_C, S_4, (m \| EV_3))) \quad (9)$$

2) In this case, C is required to perform the plea of innocence. Different from the first step, the evidence $EV_3$ is contained in the plain-text of $EV_4$. So C is only required to make the $PK_{B-C}$ publicly accessible. In such a way, parties know that previous hop is B, which was confirmed by B and C, since their signature are present. Meanwhile, new evidence $EV_2$ shows up. 3) Thereafter, B is required to perform the plea of innocence. Similar to the previous process, B finally reveals a piece of new evidence $EV_1$. 4) Afterwards, A is required to perform the plea of innocence. The process is also similar to the previous one. Finally, a piece of new evidence $EV_0$ shows up. 5) Finally, T is required to perform the plea of innocence. T is required to make a proof key publicly accessible. However, T does not have a proof key for $EV_0$, since T is the message transmitter. Therefore, T is accused of false message spreading. In this case, T can also release the three keys, which is considered as a "confession".

FIG. 2 is a schematic diagram of a system for maintaining privacy and traceability of a Blockchain-based system, which includes one or more processors; and one or more memory devices interoperably coupled with the one or more processors and having tangible, non-transitory, machine-readable media storing one or more instructions that, when executed by the one or more processors, perform one or more operations of the methods described above.

Figure 4:
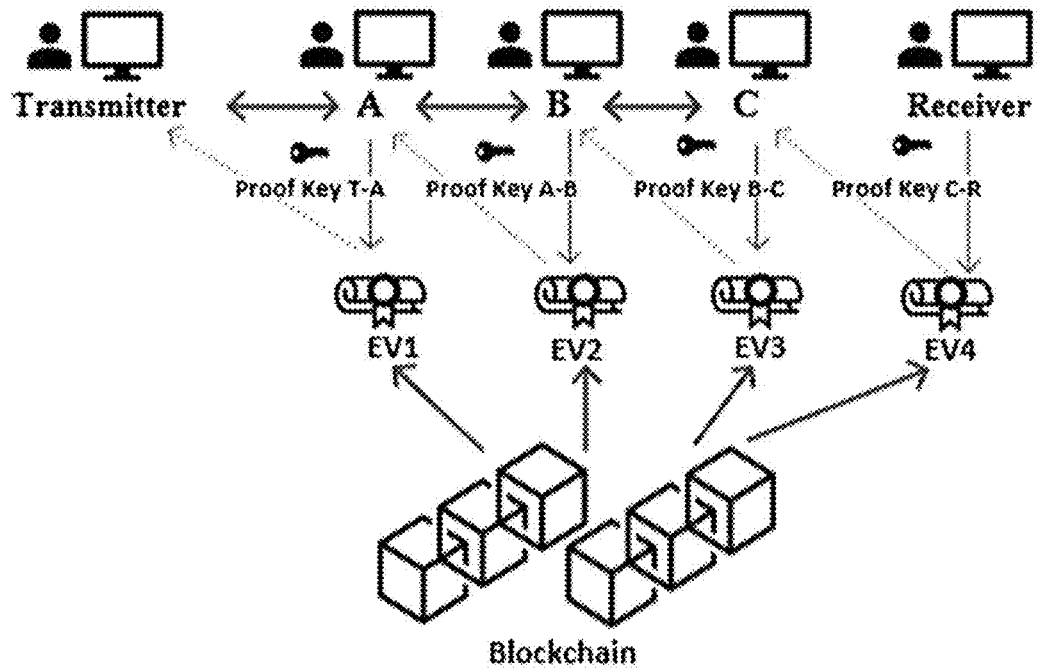
FIG. 4 is a schematic diagram showing the identity disclosure according to an exemplary embodiment of the present disclosure.

In an exemplary embodiment of the present disclosure, a device for maintaining privacy and traceability of a Blockchain-based system is shown in FIG. 4. The device includes one or more processors and one or more memory devices interoperably coupled with the one or more processors. The one or more memory devices contain a tangible, non-transitory, machine-readable media storing one or more modules including a registration module 1 for parties to sign up in the Blockchain-based system, a message transmitting module 2 for transmitting message, and an identity disclosure module 3 for disclosing the identity of a party spreading false information when the dishonest behavior has been detected.

The registration module 1 is configured to perform operations including: creating a public/private key pair for the transmitter T; using a private key $SK_T$ to sign identity information of the transmitter T and putting a public key $PubK_T$ and a generated signature together to generate the registration request; and verifying the registration request. The step of verifying the registration request further includes: comparing the public key $PubK_T$ of the transmitter T with public keys of other parties registered in the Blockchain-based system; confirming whether the public key $PubK_T$ of the transmitter T is the same as the public keys of other parties; broadcasting a confliction and rejecting the registration request, if the public key $PubK_T$ of the transmitter T is the same as any of the public keys of other parties; further checking whether the identity information of the transmitter T is valid or not, if the public key $PubK_T$ of the transmitter T is not the same as any of the public keys of other parties; rejecting the registration request, if the identity information of the transmitter T is invalid; and writing the registration request onto the Blockchain if the identity information of the transmitter T is valid.

The message transmitting module 2 is configured to perform operations including: randomly choosing at least three nodes A,B,C in a Blockchain P2P network as the relays; negotiating different encryption keys $K_{T-A}$, $K_{T-B}$, $K_{T-C}$ with the nodes; encrypting the message to be transmitted with the different encryption keys $K_{T-A}$, $K_{T-B}$, $K_{T-C}$ successively to obtain an encrypted message $EV_0$, hardcoding information of the next hop for each node inside the encrypted message; decrypting the encrypted message $EV_0$ by the encryption key $K_{T-A}$ to obtain a packet $V_0$, generating an evidence $EV_1$ once decrypted, submitting the evidence $EV_1$ to the Blockchain, and transmitting the packet $V_0$ to the node B; decrypting the packet $V_0$ by the encryption key $K_{T-B}$ to obtain a packet $V_1$, generating an evidence $EV_2$ once decrypted, submitting the evidence $EV_2$ to the Blockchain, and transmitting the packet $V_1$ to the node C; decrypting the packet $V_1$ by the encryption key $K_{T-C}$ to obtain the message, generating an evidence $EV_3$ once decrypted, submitting the evidence $EV_3$ to the Blockchain, and transmitting the message to the receiver R; and generating an evidence $EV_4$ after the receiver R received the message and submitting the evidence $EV_4$ to the Blockchain. The message transmission date includes at least the evidence $EV_1$, $EV_2$, $EV_3$, $EV_4$. The evidence $EV_1$ is generated by the following operations: signing the encrypted message $EV_0$ with the private key $SK_T$ of the transmitter T to obtain $EV_0|SIGN(SK_T,EV_0)$ and sending $EV_0|SIGN(SK_T,EV_0)$ to the node A, verifying a signature of the transmitter T by the node A using the public key $PubK_T$ of the transmitter T, signing $SIGN(SK_T,EV_0)$ with a private key $SK_A$ of the node A to obtain $SIGN(SK_A, SIGN(SK_T,EV_0))$, negotiating a new key $PK_{T-A}$, termed proof key, by the transmitter T and the node A, and encrypting $SIGN(SK_A,SIGN(SK_T,EV_0))$ with the new key $PK_{T-A}$ to generate the evidence $EV_1$. The evidence $EV_2$ is generated by the following operations: signing the evidence $EV_1$ with the private key $SK_A$ of the node A to obtain $SIGN(SK_A, V_0\|EV_1)$ and sending $SIGN(SK_A, V_0\|EV_1)$ to the node B, verifying a signature of the node A by the node B using the public key $PubK_A$ of the node A, signing $SIGN(SK_A, V_0\|EV_1)$ with a private key $SK_B$ of the node B to obtain $SIGN(SK_B, SIGN (SK_A, V_0\|EV_1)$, negotiating a proof key $PK_{A-B}$ by the node A and the node B, and encrypting $SIGN(SK_B, SIGN(SK_A, V_0\|EV_1)$ with the proof key $PK_{A-B}$ to generate the evidence $EV_2$. The evidence $EV_3$ is generated by the following operations: signing the evidence $EV_2$ with the private key $SK_B$ of the node B to obtain $SIGN(SK_B, V_1\|EV_2)$ and sending $SIGN(SK_B, V_1\|EV_2)$ to the node C, verifying a signature of the node B by the node C using the public key $PubK_B$ of the node B, signing $SIGN(SK_B, V_1\|EV_2)$ with a private key $SK_C$ of the node C to obtain $SIGN(SK_C, SIGN (SK_B, V_1\|EV_2)$, negotiating a proof key $PK_{B-C}$ by the node B and the node C, and encrypting $SIGN(SK_C, SIGN(SK_B, V_1\|EV_2)$ with the proof key $PK_{B-C}$ to generate the evidence $EV_3$. The evidence $EV_4$ is generated by the following operations: signing the encrypted message $EV_3$ with the private key $SK_C$ of the node C to obtain $SIGN(SK_C, m\|EV_3)$ and sending $SIGN(SK_C, m\|EV_3)$ to the receiver R, verifying a signature of the node C by the receiver R using the public key $PubK_C$ of the node C, signing $SIGN(SK_C, m\|EV_3)$ with a private key $SK_R$ of the receiver R to obtain $SIGN(SK_R, SIGN(SK_C, m\|EV_3)$, negotiating a proof key $PK_{C-R}$ by the node C and the receiver R, and encrypting $SIGN(SK_R, SIGN(SK_C, m\|EV_3)$ with the proof key $PK_{C-R}$ to generate the evidence $EV_4$.

The identity disclosure module 3 is configured to perform operations including: launching the identity disclosure when an identity disclosure request has been approved by a majority of parties, and decrypting the evidence $EV_1$, $EV_2$, $EV_3$, $EV_4$ using the proof keys $PK_{T-A}$, $PK_{A-B}$, $PK_{B-C}$, $PK_{C-R}$. The evidence $EV_4$ is decrypted by the following operations: locating the evidence $EV_4$ on the Blockchain by the receiver R, making a location of the evidence $EV_4$ and the proof key $PK_{C-R}$ publicly accessible, such that all parties in the Blockchain P2P network can perform a decryption process DEC $(PK_{C-R},EV_4)=SIGN(SK_R, SIGN(SK_C, m\|EV_3))=S_4$, and performing a signature verification $VERIFY(PubK_C, S_4, (m\|EV_3)))$ by all the parties. The evidence $EV_3$ is decrypted by the following operations: making $PK_{B-C}$ publicly accessible by the node C, such that all parties in the Blockchain P2P network can perform a decryption process $DEC(PK_{B-C},EV_3)=SIGN(SK_C, SIGN(SK_B, V_1\|EV_2))=S_3$, and performing a signature verification $VERIFY(PubK_B,S_3, (V_1\|EV_2)))$ by all the parties. The evidence $EV_2$ is decrypted by the following operations: making $PK_{A-B}$ publicly accessible by the node B, such that all parties in the Blockchain P2P network can perform a decryption process $DEC(PK_{A-B},EV_2)=SIGN(SK_B, SIGN(SK_A, V_0\|EV_1))=S_2$, and performing a signature verification $VERIFY(PubK_A, S_2, (V_0\|EV_1)))$ by all the parties. The evidence EV is decrypted by the following operations: making $PK_{T-A}$ publicly accessible by the node A, such that all parties in the Blockchain P2P network can perform a decryption process $DEC(PK_{T-A},EV_1)=SIGN(SK_A,SIGN(SK_T,EV_0)=S_1$, and performing a signature verification $VERIFY(PubK_T,S_1, EV_0)$ by all the parties. Finally, transmitter T is required to make a proof key publicly accessible. However, T does not have a proof key for $EV_0$, since T is the message transmitter. Therefore, T is accused of false message spreading. In this case, T can also release the encryption keys $K_{T-A}$, $K_{T-B}$, $K_{T-C}$, which is considered as a "confession".

Figure 5:
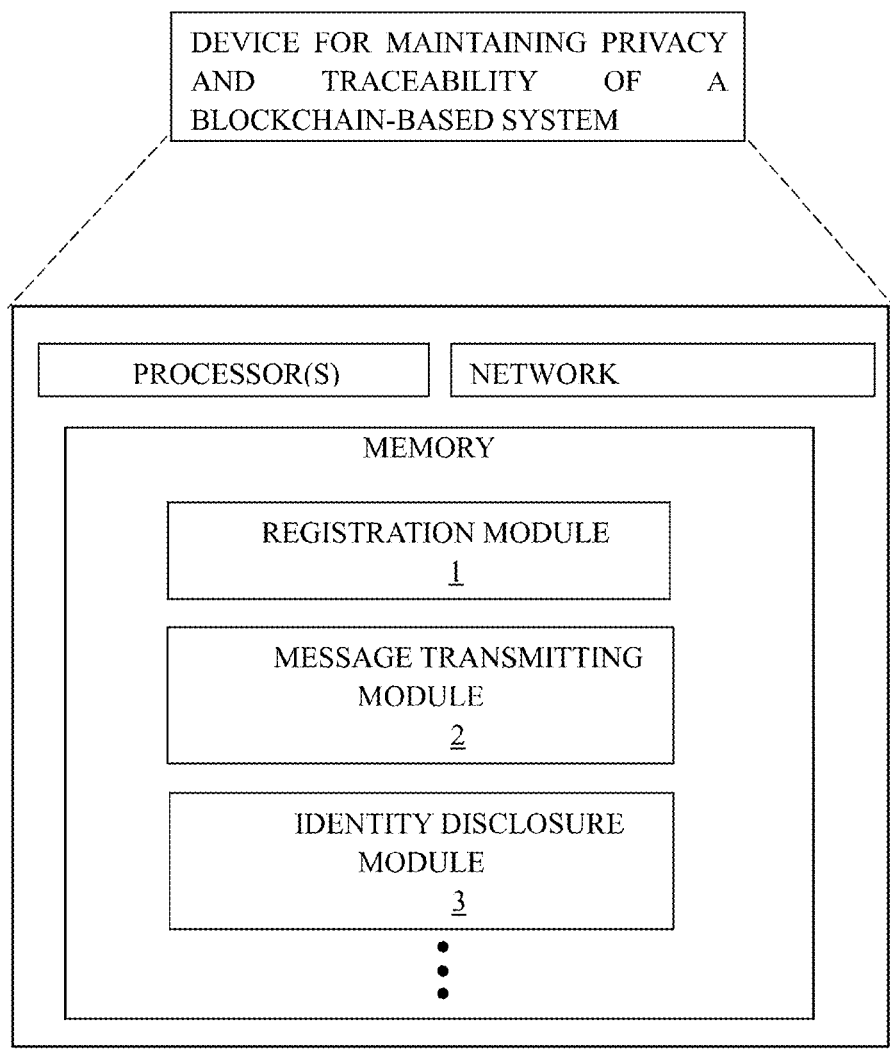
FIG. 5 is a schematic diagram of a device for maintaining privacy and traceability of a Blockchain-based system according to an exemplary embodiment of the present disclosure.
Figure 6:
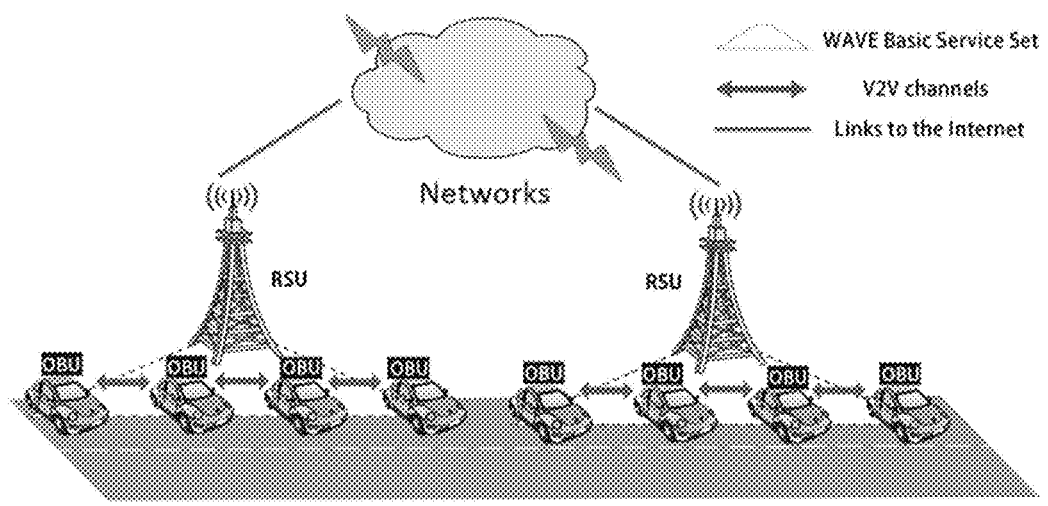
FIG. 6 is an overview of the vehicles communication system.

In an exemplary embodiment of the present disclosure, the Blockchain-based system may be Vehicular Ad Hoc Networks (VANETs). Vehicular Ad Hoc Networks (VANETs) as the term itself implies, is designed for vehicles to achieve communication. It has aroused researchers' interest since it offers a paradigm for facilitating smart city. In vehicles communication systems, vehicles are equipped with a set of sensors, Global Positioning System (GPS), and Radio Frequency Identification (RFID) tags, which allows them to sense the environment around. Examples of the applications of vehicles communication systems include navigation, path planning. For instance, in the case of path planning, vehicles may communicate with each other to share the traffic information, so that a suitable route can be selected, avoiding the traffic jams. FIG. 5 shows an overview of the vehicles communication system. Instead of using traditional Wireless Local Area Network (WLAN) and the wired network, vehicles communication system introduces Road-Side Units (RSUs) to connect the internet. These RSUs are installed along the road-sides, providing Internet access for vehicles. The coverage of each RSU is termed Wireless Advanced Vehicle Electrification (WAVE) Basic Service Set. Basically, vehicles connect to the RSUs via their On-Board Units (OBU), which is a component mounted inside each vehicle. When there is no RSU available, the vehicles can also achieve local area communication.

The introduction of the method, system, device, or non-transitory, computer-readable medium for maintaining privacy and traceability of Blockchain-based system to the Vehicular Ad Hoc Networks (VANETs) can avoid vehicles to spread false information intentionally. The motivation for introducing the Vehicular Ad Hoc Networks (VANETs) is to demonstrate the generality of the present disclosure. From a high level, VANETs in this context is built on a Blockchain-based reputation system. In such a reputation system, vehicles share useful information, such as traffic information or information about road conditions, to gain their reputations. They are self-motivated by a suite of incentive mechanism. For example, vehicles with higher reputation may have more priority to access resources, or they can use reputations to earn their gas, while a vehicle with a lower reputation may fail to access some services. Therefore, each vehicle values its reputation and tries to have a higher reputation by behaving honestly and offering good service for other vehicles. Basically, a Blockchain-based database provides endorsements for the proposed system. The endorsements are tamper-proof due to the advanced features of Blockchain. In such a scenario, privacy-preserving is an indispensable requirement. Vehicles may require to remain anonymous for various reasons. For example, vehicles may be easy to be convinced by a message from a vehicle with higher reputation, while they may fail to believe information from a vehicle with a low reputation. In this case, the vehicles with a low reputation, like a vehicle that has newly joined the system, may never have a chance to earn its reputation. Therefore, the solution of the present disclosure offers opportunities for vehicles with lower reputations due to the privacy-preserving feature. On the other hand, the solution of the present disclosure can also work inversely and identifies these vehicles spreading false information. Once identified, punishments are enforced for these dishonest vehicles. One punishment can be decreasing their reputations. Finally, considering the limited storage resource of vehicles, the designer can choose RSUs to deploy the solution of the present disclosure, while vehicles can communicate with RSUs via VANET. It can be observed that the solution of the present disclosure can be extended to other similar scenarios with a little hindrance. For example, in the context of crowd-sourcing systems, employers/employees can also set up such a system based on the solution of the present disclosure to achieve privacy and traceability simultaneously. They may also use the idea of a reputation system to evaluate an employer/employee, and penalize the malicious parties when un-honest behaviors are detected. Moreover, by using the smart contracts, the entire process may be executed automatically without human's involvement, reducing the burdens of management.

Hereinafter, the security analysis is presented to show the security performance when applying the solution of the present disclosure. Specifically, an attacker may intentionally create craft-packets and try to deploy attacks on the system applying the solution of the present disclosure in various ways. Notably, the transmitter, relaying nodes, receiver are examined throughout the lifecycle of a transaction and conduct five attack vectors in regards of security analysis, as shown in TABLE 2.

TABLE 2

| Attack Surface(✓refers to our solution can defend the attack without any changes) | | | |
|---|---|---|---|
| Attack Name | Initiator | Number of Attackers | our solution |
| Malicious-Transmitter | Transmitter | Single | ✓ |
| Malicious-Messenger | Relaying nodes | Single | ✓ |
| Replay | All participants | Single | ✓ |
| Calumniating | Reciever | Single | ✓ |
| Collusion | All participants | Multiple | ✓ |

It can be observed that the solution of the present disclosure can hinder all the attack vectors without any change.

Malicious-Transmitter Attack: In this type of attack, a malicious transmitter may create a false message intentionally, and uses another message, which is considered benign, to generate shreds of evidence. We assume that the false message is $m_{fake}$, and the benign message is m. His motivation is to evade responsibility when the false message is detected. However, it is not possible for attackers to achieve so. In this case, the party A will not allow the transmitter to do so since the evidence is not the one A received from the transmitter. Even if A is compromised by T, this type of attack still fails, since A may require to publish all the keys eventually, and $m_{fake} \neq m$.

Malicious-Messenger Attack: In this case, the malicious party is one of the relaying nodes, e.g. B in the exemplary embodiment described above. B creates a false message $m_{fake}$ intentionally, and instead of using the original evidence, which is $EV_2$ in the exemplary embodiment described above, B crafts new evidence $EV_2'$ based on a fake message $m_{fake}$. B also crafts a fake $V_1'$ based on the fake message $m_{fake}$. To notice, B does not know who will be the receiver, so B chooses a receiver R' randomly. B's goal is to conceive others to believe the false message is from the transmitter. This type of attack will fail quickly. Since when the identity disclosure process occurs, the attacker can not link the fake evidence $EV_2'$ to its previous evidence $EV_1$. However, if B only crafts a fake $V_1'$ based on the fake message $m_{fake}$, and uses the original $EV_2$, the attack will still fail. The reason is similar to the first case, and will not be repeated.

Replay Attack: Replay attack occurs when malicious relaying nodes resend a previous message and use the same evidence that used before. However, our timestamp can provide freshness for each message. The message receiver will discard the messages when they are stale.

Calumniating Attack: In this type of attack, a malicious receiver may create a false message/evidence intentionally, and tries to conceive others to believe the false message is from the transmitter. Assuming that the false message is $m_{fake}$, and the original message is m. Therefore, in the exemplary embodiment of the present disclosure, $EV_4$ can be represented as follows:

$$EV_4=ENC(PK_{C-R},SIGN(Sk_R,SIGN(Sk_C,m_{fake}\|EV_3))) \quad (10)$$

However, the attacker can not modify or replace the evidence $EV_3$. This is because $EV_4$ is generated by C and R corporately, and C will not put its signature on it, if C detects $EV_3 \neq EV_4$. Therefore, as described in the identity disclosure above, $EV_3$ can be traced back to $EV_0$. At this moment, T will make the three keys, i.e. $K_{T-A}$, $K_{A-B}$, $K_{B-C}$, publicly accessible, so that all parties can recover the original message m. It can be observed that $m_{fake} \neq m$, which turns out that R tires to perform a Calumniating Attack.

Collusion Attack: In this case, two parties work jointly, and tries to craft a fake message. However, this type of attack is subject to the analysis in the previous examples. That is, the goal of an attacker is to create fake evidence or a fake message, and these fake ones fail to equal the previous evidence when parties perform the identity disclosure. Therefore, the solution of the present disclosure can defend this type of attacks with no changes. Moreover, in the exemplary embodiments described above, only three relaying nodes are involved. It can be much more complicated for the attacker to deploy a Collusion Attack when more relaying nodes are presented, which hinders the Collusion Attack effectively.

The processor described in the above exemplary embodiments may include, but is not limited to, a processing apparatus such as a microprocessor (MCU, Microcontroller Unit) or a programmable logic device (FPGA, Field Programmable Gate Array). The memory device described in the above exemplary embodiments may be configured to store a software program and modules of an application, for example, program instructions or modules corresponding to the methods in the above exemplary embodiments. The processor runs the software program and modules stored in the memory device to implement various functional applications, that is, implement the method for maintaining privacy and traceability of a Blockchain-based system as described above. The memory device may include a high-speed random access memory, and may also include a nonvolatile memory, for example, one or more magnetic storage devices, flash memories or other nonvolatile solid-state memories. In some examples, the memory device may further include memories remotely disposed relative to the processor, and these remote memories may be connected to the communication device through a network. Examples of the network include, but are not limited to, the Internet, an intranet, a local area network, a mobile communications network, or a combination thereof.

Those of ordinary skill in the art should understand that all or some of the steps in the method disclosed above as well as functional modules or units in the system and device disclosed above may be implemented as software, firmware, hardware, and appropriate combinations thereof. In a hardware implementation, the division between the functional modules or units mentioned in the above description does not necessarily correspond to the division of physical components. For example, a physical component may have more than one function, or one function or step may be performed by several physical components through collaboration. Some or all of the components may be implemented as software executed by a processor such as a digital signal processor or microprocessor, or implemented as hardware, or implemented as integrated circuits, such as application-specific integrated circuits. Such software may be distributed over a computer readable medium. The computer readable medium may include computer storage media (or non-temporary media) and communication media (or temporary media). As is well-known to those of ordinary skill in the art, the term "computer storage medium" includes volatile and non-volatile, removable and non-removable media implemented in any method or technology used to store information (such as computer readable instructions, data structures, program modules or other data). The computer readable medium includes, but is not limited to, a RAM, a ROM, an EEPROM, a flash memory or other memory technologies, a CD-ROM, a digital versatile disk (DVD) or other optical disk storage, magnetic cassettes, magnetic tapes, disk storage or other magnetic storage devices, or any other media that may be used to store desired information and accessible to computers. In addition, as is well-known to those of ordinary skill in the art, a communication medium usually includes computer-readable instructions, data structures, program modules, or other data in modulated data signals such as carriers or other transmission mechanisms, and may include any information delivery medium.

The above shows and describes the basic principles and main features of the present disclosure as well as the advantages of the present disclosure. The present disclosure is not limited by the above exemplary embodiments. Described in the above exemplary embodiments and the specification are merely the principles of the present disclosure. On the premise of not departing from the spirit and scope of the present disclosure, the present disclosure will have various changes and improvements, all of which fall within the scope of the present disclosure for which protection is sought.

What is claimed is:

1. A method for maintaining privacy and traceability of a Blockchain-based system comprising:
    registering users in a Blockchain-based system by:
        creating a public/private key pair for a transmitter T;
        using a private key $SK_T$ to sign identity information of the transmitter T and putting a public key $PubK_T$ and a generated signature together to generate a registration request; and
        verifying the registration request;
    transmitting a message from the transmitter T to a receiver R via an anonymous network, after the registration request of the transmitter T has been approved and storing message transmission data generated during a message transmission process in a Blockchain; and
    performing an identity disclosure by using the message transmission data when the message is detected to be false;
    wherein the anonymous network transmits the message by onion routing.

2. The method of claim 1, wherein the step of verifying the registration request comprises:
    comparing the public key $PubK_T$ of the transmitter T with public keys of other parties registered in the Blockchain-based system;
    confirming whether the public key $PubK_T$ of the transmitter T is the same as the public keys of other parties;
    broadcasting a confliction and rejecting the registration request, if the public key $PubK_T$ of the transmitter T is the same as any of the public keys of other parties;

further checking whether the identity information of the transmitter T is valid or not, if the public key $PubK_T$ of the transmitter T is not the same as any of the public keys of other parties;

rejecting the registration request, if the identity information of the transmitter T is invalid; and writing the registration request onto the Blockchain if the identity information of the transmitter T is valid.

3. The method of claim 1, wherein the Blockchain-based system is Vehicular Ad Hoc Networks (OVANETs) for avoiding vehicles to spread false information intentionally.

4. The method of claim 1, wherein the message contains a timestamp to guarantee freshness of the message.

5. A method for maintaining privacy and traceability of a Blockchain-based system comprising:

registering users in a Blockchain-based system;

after a registration request of the transmitter T has been approved, transmitting a message from a transmitter T to a receiver R via an anonymous network by:

randomly choosing at least three nodes A,B,C in a Blockchain P2P network as relays;

negotiating different encryption keys $K_{T-A}$, $K_{T-B}$, $K_{T-C}$ with the nodes;

encrypting the message to be transmitted with the different encryption keys $K_{T-A}$, $K_{T-B}$, $K_{T-C}$ successively to obtain an encrypted message $EV_0$;

hard-coding information of the next hop for each node inside the encrypted message;

decrypting the encrypted message $EV_0$ by the encryption key $K_{T-A}$ to obtain a packet $V_0$, generating an evidence $EV_1$ once decrypted, submitting the evidence $EV_1$ to the Blockchain, and transmitting the packet $V_0$ to the node B;

decrypting the packet $V_0$ by the encryption key $K_{T-B}$ to obtain a packet $V_1$, generating an evidence $EV_2$ once decrypted, submitting the evidence $EV_2$ to the Blockchain, and transmitting the packet $V_1$ to the node C;

decrypting the packet $V_1$ by the encryption key $K_{T-C}$ to obtain the message, generating an evidence $EV_3$ once decrypted, submitting the evidence $EV_3$ to the Blockchain, and transmitting the message to the receiver R; and generating an evidence $EV_4$ after the receiver R received the message and submitting the evidence $EV_4$ to the Blockchain;

wherein the message transmission date comprises at least the evidence $EV_1$, $EV_2$, $EV_3$, $EV_4$;

storing message transmission data generated during the message transmission process in a Blockchain; and performing an identity disclosure by using the message transmission data when the message is detected to be false;

wherein the anonymous network transmits the message by onion routing.

6. The method of claim 5, wherein the steps of generating the evidence $EV_1$, $EV_2$, $EV_3$, $EV_4$ comprise:

signing the encrypted message $EV_0$ with the private key $SK_T$ of the transmitter T to obtain $EV_0|SIGN(SK_T,EV_0)$ and sending $EV_0|SIGN(SK_T,EV_0)$ to the node A, verifying a signature of the transmitter T by the node A using the public key $PubK_T$ of the transmitter T, signing $SIGN(SK_T,EV_0)$ with a private key $SK_A$ of the node A to obtain $SIGN(SK_A,SIGN(SK_T,EV_0))$, negotiating a new key $PK_{T-A}$, termed proof key, by the transmitter T and the node A, and encrypting $SIGN(SK_A,SIGN(SK_T, EV_0))$ with the new key $PK_{T-A}$ to generate the evidence $EV_1$;

signing the evidence $EV_1$ with the private key $SK_A$ of the node A to obtain $SIGN(SK_A, V_0||EV_1)$ and sending $SIGN(SK_A, V_0||EV_1)$ to the node B, verifying a signature of the node A by the node B using the public key $PubK_A$ of the node A, signing $SIGN(SK_A, V_0||EV_1)$ with a private key $SK_B$ of the node B to obtain $SIGN(SK_B, SIGN(SK_A, V_0||EV_1))$, negotiating a proof key $PK_{A-B}$ by the node A and the node B, and encrypting $SIGN(SK_B, SIGN(SK_A, V_0||EV_1))$ with the proof key $PK_{A-B}$ to generate the evidence $EV_2$;

signing the evidence $EV_2$ with the private key $SK_B$ of the node B to obtain $SIGN(SK_B, V_1||EV_2)$ and sending $SIGN(SK_B, V_1||EV_2)$ to the node C, verifying a signature of the node B by the node C using the public key $PubK_B$ of the node B, signing $SIGN(SK_B, V_1||EV_2)$ with a private key $SK_C$ of the node C to obtain $SIGN(SK_C, SIGN(SK_B, V_1||EV_2))$, negotiating a proof key $PK_{B-C}$ by the node B and the node C, and encrypting $SIGN(SK_C, SIGN(SK_B, V_1||EV_2))$ with the proof key $PK_{B-C}$ to generate the evidence $EV_3$; and signing the encrypted message $EV_3$ with the private key $SK_C$ of the node C to obtain $SIGN(SK_C, m||EV_3)$ and sending $SIGN(SK_C, m||EV_3)$ to the receiver R, verifying a signature of the node C by the receiver R using the public key $PubK_C$ of the node C, signing $SIGN(SK_C, m||EV_3)$ with a private key $SK_R$ of the receiver R to obtain $SIGN(SK_R, SIGN(SK_C, m||EV_3))$, negotiating a proof key $PK_{C-R}$ by the node C and the receiver R, and encrypting $SIGN(SK_R, SIGN(SK_C, m||EV_3))$ with the proof key $PK_{C-R}$ to generate the evidence $EV_4$.

7. The method of claim 6, wherein the proof keys $PK_{T-A}$, $PK_{A-B}$, $PK_{B-C}$, $PK_{C-R}$ are respectively kept by two sides involved in the negotiation of each proof key, the encryption key $K_{T-A}$ and the proof key $PK_{T-A}$ cannot be the same, and every time when a new message is transmitted, new proof keys are negotiated.

8. The method of claim 6, wherein the step of performing an identity disclosure comprises:

launching the identity disclosure when an identity disclosure request has been approved by a majority of parties; and decrypting the evidence $EV_1$, $EV_2$, $EV_3$, $EV_4$ using the proof keys $PK_{T-A}$, $PK_{A-B}$, $PK_{B-C}$, $PK_{C-R}$.

9. The method of claim 8, wherein the step of decrypting the evidence $EV_1$, $EV_2$, $EV_3$, $EV_4$ using the proof keys $PK_{T-A}$, $PK_{A-B}$, $PK_{B-C}$, $PK_{C-R}$ comprises:

locating the evidence $EV_4$ on the Blockchain by the receiver R, making a location of the evidence $EV_4$ and the proof key $PK_{C-R}$ publicly accessible, such that all parties in the Blockchain P2P network can perform a decryption process $DEC(PK_{C-R},EV_4)=SIGN(SK_R, SIGN(SK_C, m||EV_3))=S_4$, and performing a signature verification $VERIFY(PubK_C,S_4,(m||EV_3))$ by all the parties;

making $PK_{B-C}$ publicly accessible by the node C, such that all parties in the Blockchain P2P network can perform a decryption process $DEC(PK_{B-C},EV_3)=SIGN(SK_C, SIGN(SK_B, V_1||EV_2))=S_3$, and performing a signature verification $VERIFY(PubK_B,S_3,(V_1||EV_2))$ by all the parties;

making $PK_{A-B}$ publicly accessible by the node B, such that all parties in the Blockchain P2P network can perform a decryption process $DEC(PK_{A-B},EV_2)=SIGN(SK_B,$ SIGN($SK_A$, $V_0\|EV_1$))=$S_2$, and performing a signature verification VERIFY(PubK$_A$,$S_2$,($V_0\|EV_4$))) by all the parties;

making PK$_{T-A}$ publicly accessible by the node A, such that all parties in the Blockchain P2P network can perform a decryption process DEC(PK$_{T-A}$,EV$_1$)=SIGN(SK$_A$, SIGN(SK$_T$,EV$_0$)=$S_1$, and performing a signature verification VERIFY(PubK$_T$,$S_1$,EV$_0$)) by all the parties; and releasing encryption keys $K_{T-A}$, $K_{T-B}$, $K_{T-C}$ by the transmitter T after T is accused of false message spreading.

10. A system for maintaining privacy and traceability of a Blockchain-based system, comprising:
one or more processors; and
one or more memory devices interoperably coupled with the one or more processors and having tangible, non-transitory, machine-readable media storing one or more instructions that, when executed by the one or more processors, perform one or more operations comprising:
registering users in a Blockchain-based system by:
creating a public/private key pair for a transmitter T;
using a private key SK$_T$ to sign identity information of the transmitter T and putting a public key PubK$_T$ and a generated signature together to generate a registration request; and
verifying the registration request;
transmitting a message from the transmitter T to a receiver R via an anonymous network, after the registration request of the transmitter T has been approved and storing message transmission data generated during a message transmission process in a Blockchain; and
performing an identity disclosure by using the message transmission data when the message is detected to be false;
the anonymous network transmits the message by onion routing.

11. The system of claim 10, wherein the step of transmitting the message from the transmitter T to a receiver R via the anonymous network comprises:
randomly choosing at least three nodes A, B, C in a Blockchain P2P network as the relays;
negotiating different encryption keys $K_{T-A}$, $K_{T-B}$, $K_{T-C}$ with the nodes;
encrypting the message to be transmitted with the different encryption keys $K_{T-A}$, $K_{T-B}$, $K_{T-C}$ successively to obtain an encrypted message EV$_0$;
hard-coding information of the next hop for each node inside the encrypted message;
decrypting the encrypted message EV$_0$ by the encryption key $K_{T-A}$ to obtain a packet $V_0$, generating an evidence EV$_1$ once decrypted, submitting the evidence EV$_1$ to the Blockchain, and transmitting the packet $V_0$ to the node B;
decrypting the packet $V_0$ by the encryption key $K_{T-B}$ to obtain a packet generating an evidence EV$_2$ once decrypted, submitting the evidence EV$_2$ to the Blockchain, and transmitting the packet $V_1$ to the node C;
decrypting the packet $V_1$ by the encryption key $K_{T-C}$ to obtain the message, generating an evidence EV$_3$ once decrypted, submitting the evidence EV$_3$ to the Blockchain, and transmitting the message to the receiver R; and
generating an evidence EV$_4$ after the receiver R received the message and submitting the evidence EV$_4$ to the Blockchain;
wherein the message transmission date comprises at least the evidence EV$_1$, EV$_2$, EV$_3$, EV$_4$.

12. The system of claim 11, wherein the steps of generating the evidence EV$_1$, EV$_2$, EV$_3$, EV$_4$ comprise:
signing the encrypted message EV$_0$ with the private key SK$_T$ of the transmitter T to obtain EV$_0$|SIGN(SK$_T$,EV$_0$) and sending EV$_0$|SIGN(SK$_T$,EV$_0$) to the node A, verifying a signature of the transmitter T by the node A using the public key PubK$_T$ of the transmitter T, signing SIGN(SK$_T$,EV$_0$) with a private key SK$_A$ of the node A to obtain SIGN(SK$_A$,SIGN(SK$_T$,EV$_0$)), negotiating a new key PK$_{T-A}$, termed proof key, by the transmitter T and the node A, and encrypting SIGN(SK$_A$,SIGN(SK$_T$, EV$_0$)) with the new key PK$_{T-A}$ to generate the evidence EV$_1$;
signing the evidence EV$_1$ with the private key SK$_A$ of the node A to obtain SIGN(SK$_A$, $V_0\|EV_1$) and sending SIGN(SK$_A$, $V_0\|EV_1$) to the node B, verifying a signature of the node A by the node B using the public key PubK$_A$ of the node A, signing SIGN(SK$_A$, $V_0\|EV_1$) with a private key SK$_B$ of the node B to obtain SIGN (SK$_B$, SIGN(SK$_A$, $V_0\|EV_1$), negotiating a proof key PK$_{A-B}$ by the node A and the node B, and encrypting SIGN(SK$_B$, SIGN(SK$_A$, $V_0\|EV_1$) with the proof key PK$_{A-B}$ to generate the evidence EV$_2$;
signing the evidence EV$_2$ with the private key SK$_B$ of the node B to obtain SIGN(SK$_B$, $V_1\|EV_2$) and sending SIGN(SK$_B$, $V_1\|EV_2$) to the node C, verifying a signature of the node B by the node C using the public key PubK$_B$ of the node B, signing SIGN(SK$_B$, $V_1\|EV_2$) with a private key SK$_C$ of the node C to obtain SIGN(SK$_C$, SIGN(SK$_B$, $V_1\|EV_2$), negotiating a proof key PK$_{B-C}$ by the node B and the node C, and encrypting SIGN(SK$_C$, SIGN(SK$_B$, $V_1\|EV_2$) with the proof key PK$_{B-C}$ to generate the evidence EV$_3$; and
signing the encrypted message EV$_3$ with the private key SK$_C$ of the node C to obtain SIGN(SK$_C$, m$\|$EV$_3$) and sending SIGN(SK$_C$, m$\|$EV$_3$) to the receiver R, verifying a signature of the node C by the receiver R using the public key PubK$_C$ of the node C, signing SIGN(SK$_C$, m$\|$EV$_3$) with a private key SK$_R$ of the receiver R to obtain SIGN(SK$_R$, SIGN(SK$_C$, m$\|$EV$_3$), negotiating a proof key PK$_{C-R}$ by the node C and the receiver R, and encrypting SIGN(SK$_R$, SIGN(SK$_C$, m$\|$EV$_3$) with the proof key PK$_{C-R}$ to generate the evidence EV$_4$.

13. The system of claim 12, wherein the step of performing an identity disclosure comprises:
launching the identity disclosure when an identity disclosure request has been approved by a majority of parties; and
decrypting the evidence EV$_1$, EV$_2$, EV$_3$, EV$_4$ using the proof keys PK$_{T-A}$, PK$_{A-B}$, PK$_{B-C}$, PK$_{C-R}$.

* * * * *